(12) United States Patent
Awadallah et al.

(10) Patent No.: US 8,280,993 B2
(45) Date of Patent: Oct. 2, 2012

(54) SYSTEM AND METHOD FOR DETECTING INTERNET BOTS

(75) Inventors: Amr Awadallah, Palo Alto, CA (US); Sajjit Thampy, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 742 days.

(21) Appl. No.: 11/867,096

(22) Filed: Oct. 4, 2007

(65) Prior Publication Data

US 2009/0094311 A1    Apr. 9, 2009

(51) Int. Cl.
*G06F 15/173* (2006.01)
*G06F 15/16* (2006.01)

(52) U.S. Cl. .......... 709/223; 709/202
(58) Field of Classification Search ......... 709/202, 709/223
See application file for complete search history.

(56) References Cited

U.S. PATENT DOCUMENTS

| | | | |
|---|---|---|---|
| 7,139,916 B2 * | 11/2006 | Billingsley et al. | 713/182 |
| 7,516,220 B1 | 4/2009 | Stiert | |
| 2002/0169865 A1 * | 11/2002 | Tarnoff | 709/223 |
| 2007/0094355 A1 | 4/2007 | Mulakala | |
| 2007/0266305 A1 * | 11/2007 | Cong et al. | 715/500.1 |
| 2008/0109553 A1 * | 5/2008 | Fowler | 709/229 |
| 2008/0183745 A1 * | 7/2008 | Cancel et al. | 707/102 |
| 2008/0301808 A1 | 12/2008 | Calo | |
| 2009/0094311 A1 | 4/2009 | Awadallah | |

OTHER PUBLICATIONS

Office Action for U.S. Appl. No. 12/211,606, May 14, 2010.

* cited by examiner

*Primary Examiner* — Quang N Nguyen
*Assistant Examiner* — David X Yi
(74) *Attorney, Agent, or Firm* — SNR Denton US LLP

(57) ABSTRACT

Apparatuses, methods, and systems directed to detect Internet bots in communication networks. Some embodiments of the invention allow an agent of a server to detect human interaction events on a client system. In other particular embodiments, the systems and methods disclosed below can be used to detect bots using server logs. In some other embodiments, the present invention involves sending an agent to a client system and polling the agent on whether human interaction events are detected on the client system.

14 Claims, 5 Drawing Sheets

SYSTEM AND METHOD FOR DETECTING INTERNET BOTS

TECHNICAL FIELD

The present disclosure relates to detecting Internet bots in network communications.

BACKGROUND

Internet bots are software applications that perform automated tasks over the Internet. They are also known as web robots or bots and have been used in a variety of Internet applications. Web crawlers use bots to automatically fetch and index web pages from various web sites so that search engines can perform queries on the indexed web pages. Bots have been used in online auction sites to discover bargains. In online gaming sites, bots have been used where a response speed faster than that of human is desirable. In instant messenger applications, bots have been used to answer routine questions such as questions related to weather conditions, sporting event scores, and currency conversions.

Bots, however, may be used for malicious purposes. Bots have been used in automated operations to attack networked computers. For example, in a "denial of service" attack, a large number of bots, which may be geographically distributed, may saturate the target server with external communication requests so that the target server cannot respond to legitimate requests. Bots may also be used to influence ranking of search engine results. Search engines may use click data on search results to improve search results ranking. Bots may be used to repeatedly access certain search results from a large number of web sites to influence the ranking of the accessed search results.

Malicious bots may also be created in order to repeatedly access advertising-supported links to intentionally create the false appearance of many web site visits by human viewers. Advertising-supported links are generally short segments of text that are linked to an advertiser's web site. When a human viewer clicks on an advertising-supported link, the viewer "clicks through" the text link to visit the advertiser's web site. Many advertising-supported web sites have offered to sell advertising on a pay-per-click basis wherein the advertising-supported web site is only paid when a viewer "clicks through" on an advertising-supported link. When malicious bots are used to repeatedly click on advertising-supported links on a web site, web site advertisers are erroneously charged. Such attempts to create fictitious clicks on advertising-supported links are known as "click fraud".

In these and other contexts, a key factor to combat malicious bots is the ability to detect whether a communication request to a web site comes from an Internet bot or a human viewer. However, since a large number of requests from bots may not be malicious, and the volume of communication requests to a web site may be extremely high, it is a challenging task to find a scalable method to detect bots.

SUMMARY

The present invention provides apparatuses, methods, and systems directed to detecting Internet bots in network communication. Some embodiments of the present invention allow an agent of a server to detect human interaction events on a client system. Other embodiments of the present invention can be used to detect bots using server logs. Yet other embodiments of the present invention comprise sending an agent to a client system and using the agent to detect whether human interaction events are occurring on the client system. These human interaction events can be correlated with clickstream activity detected at a remote server to validate the clickstream activity.

In one embodiment of the present invention, the apparatuses and methods are directed to detecting human interaction events on a client system by an agent trusted by a server, wherein an agent is an executable program on the client system. Human interaction events are events caused by human interaction with the client system. The agent collects data associated with the detected human interaction events and sends the collected data to the server. In some embodiments, the agent sends an HTTP request to the server, wherein the collected data is encoded in the parameters of the HTTP request.

In other embodiments of the present invention, the apparatuses, methods, and systems involve processing a server log to identify human interaction events. In some embodiments, one or more IP addresses and user sessions are identified from the server log and human interaction events are identified for each IP address and each user session.

In some other embodiments of the present invention, a server sends an agent to a client system to detect human interaction events on the client system. The agent is able to detect human interaction events on the client system. The server periodically polls the agent to determine whether human interaction events are detected on the client system.

The following detailed description together with the accompanying drawings will provide a better understanding of the nature and advantages of various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
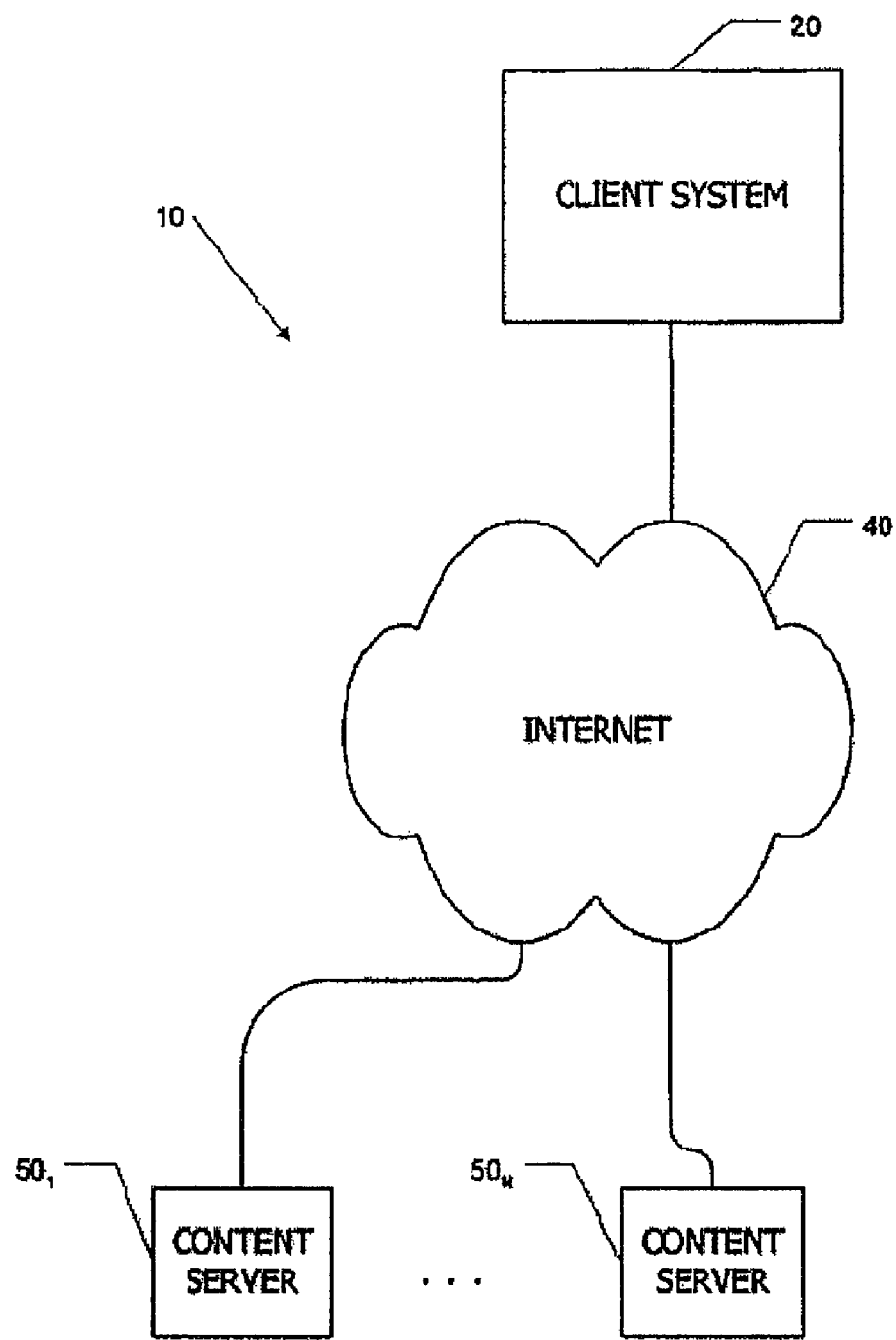
FIG. 1 is a diagram showing an example communication network, which network may be used with an embodiment of the present invention.

FIG. 1 illustrates a general overview of a communication network 10 including a client system 20 according to one particular embodiment of the present invention. In computer network 10, client system 20 is coupled through the Internet 40, or other communication network, e.g., over any local area network (LAN) or wide area network (WAN) connection, to any number of content servers $50_1$ to $50_N$. As will be described herein, client system 20 is configured according to the present invention to communicate with any of servers $50_1$ to $50_N$, e.g., to access, receive, retrieve and/or display web pages, text or graphical advertisements, and other information such as audio or video media content.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to process and view information and web pages available to it from content servers $50_1$ to $50_N$ over Internet 40.

Client system 20 also typically includes one or more user interface devices that are manipulated or controlled by a human, such as a keyboard, a mouse, touch screen, pen or the like, for interacting with a graphical user interface (GUI) provided by the browser on a display (e.g., monitor screen, LCD display, etc.), in conjunction with pages, forms and other information provided by servers $50_1$ to $50_N$ or other servers. The present invention is suitable for use with the Internet, which refers to a specific global network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are configurable and made operative using an application including computer code run using a central processing unit such as an Intel x86-compatible microprocessor, an AMD x86-compatible microprocessor, or the like or multiple microprocessors. Computer code for configuring and operating client system 20 to communicate, process and display data and media content as described herein is preferably downloaded and stored on a hard disk, but the entire program code, or portions thereof, may also be stored in any other volatile or non-volatile memory medium or device such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of content servers $50_1$ to $50_N$ to client system 20 over the Internet, or transmitted over any other network connection (e.g., extranet, VPN, LAN, or other conventional networks) using any communication medium and protocol (e.g., TCP/IP, HTTP, HTTPS, Ethernet, or other conventional media and protocol).

It should be appreciated that computer code for implementing embodiments of the present invention can be C, C++, HTML, XML, Java, etc., or any suitable scripting language, e.g., VBScript, JavaScript, or any other suitable programming language that can be executed on client system 20 or compiled to execute on client system 20. In some embodiments, needed code is embedded in a web page and sent to client system 20 and executed, or code already present at client system 20 is executed.

B. Client System

Figure 2:
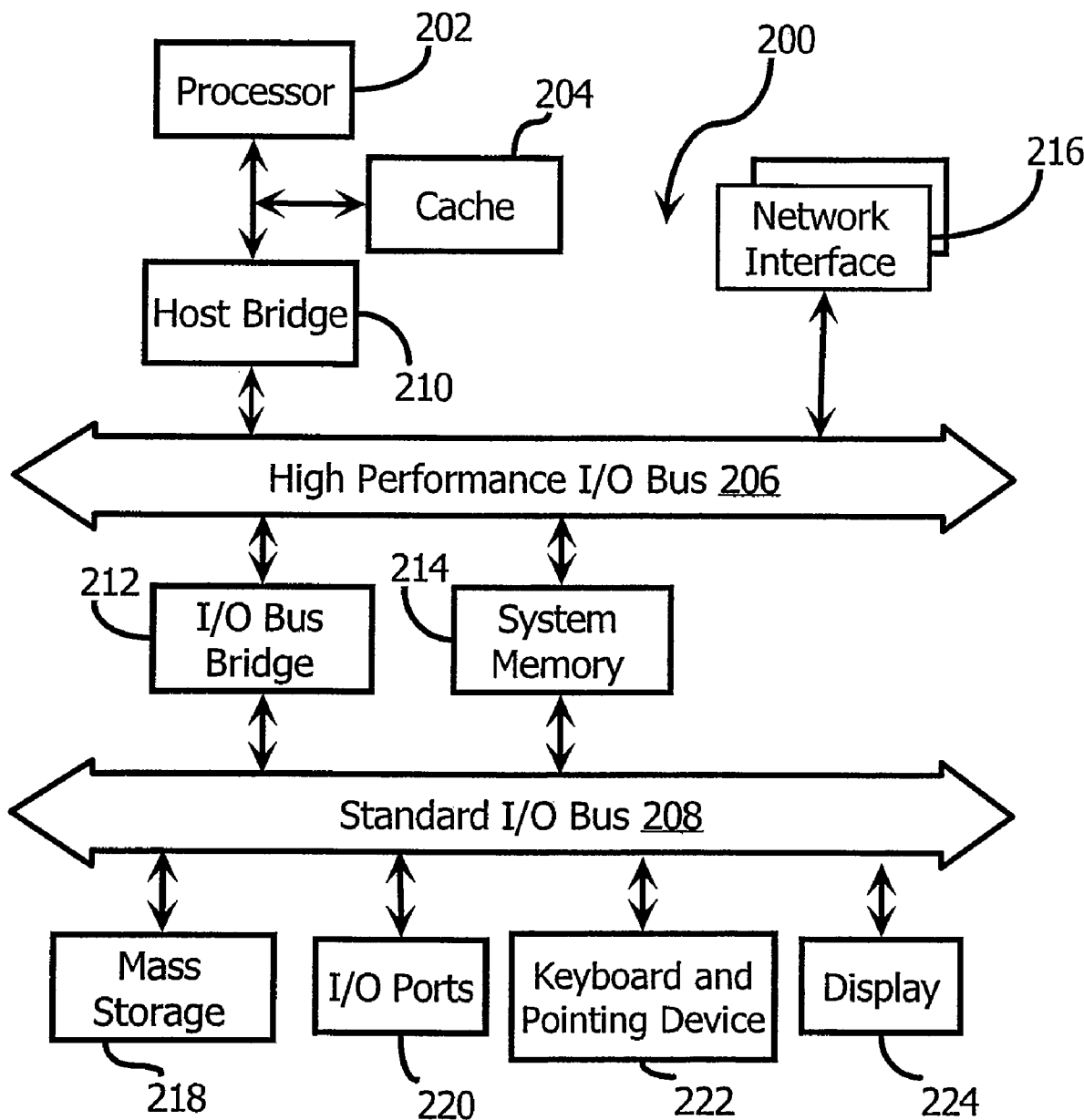
FIG. 2 is a diagram showing an example system architecture for a client system or a server, which may be used by an embodiment of the present invention.

FIG. 2 illustrates, for didactic purposes, a hardware system 200, which may be used to implement a client system or a server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, I/O devices, or memories.

In one embodiment, the detection process described herein is implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., UNIX operating systems, and the like.

C. Detection of Internet Bots

Figure 3:
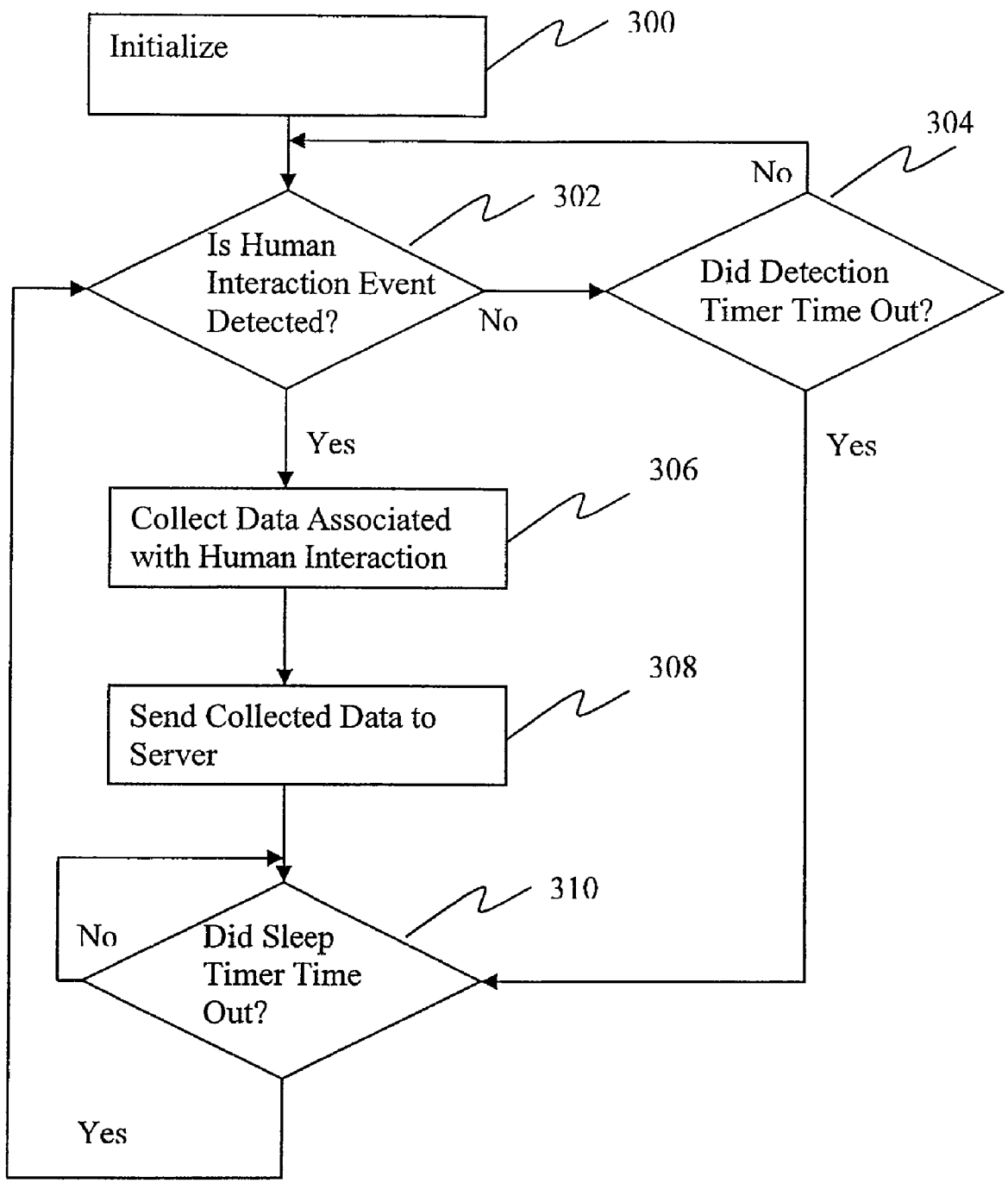
FIG. 3 is a diagram showing a flowchart of the example process used for detecting one or more human interaction events on a client system.

FIG. 3 illustrates an example process used for detecting one or more human interaction events on a client system, which process may be used by an embodiment of the present invention. A human interaction event is generated by human interaction with an application running on the client system. A human typically interacts with the client system via a human manipulated input/output (I/O) device such as a mouse or a keyboard. In some embodiments, a human may use other input or output devices such as touch screens, pens, speech recognition devices to interact with the client system.

In the first step 300, the agent is initialized. In some embodiments, initialization comprises activating an agent downloaded to a client system from a server. An agent may be a program trusted by the server. The program may be written in a variety of programming or scripting languages such as Java, JavaScript or ActionScript of Macromedia Flash. In some embodiments, the agent may be downloaded from the server and operate within the context of a user agent, such as a browser client. For example, the agent may comprise JavaScript code that monitors for indications of human activity. In other implementations, the agent may be a Java program that operates in connection with a Java Virtual Machine, which itself can be a plug-in to a user agent, such as a browser client. The initialization may be triggered by a focus event generated by mouse movements from a mouse or keys pressed on a keyboard wherein the mouse or the keyboard is attached to the client system.

There may be multiple applications running on the client system. Bots may be running in some of the applications while a human is interacting with other applications running on the same client system. The initialization step 300 is typically triggered when a human moves mouse focus to one of the running applications on the client system. Focus may be moved to an application through a mouse click or by pressing a keyboard combination such as the combination of the ALT and the TAB keys. Typically, an embodiment of the present invention is initialized on each running application on the client system. For example, there may be multiple Internet browser applications running on the client system. An embodiment of the present invention may be a JavaScript program embedded in a web page and initialized when a browser application gets focus. An embodiment of the present invention may also be a Macromedia Flash component such as an ActionScript initialized when a browser application gets focus.

After initialization, the agent checks whether any human interaction events were detected in step 302. In some embodiments, input/output device manipulation results in data being accumulated in a buffer, which is then processed by the operating system. Application programming interfaces allow the agent to register as a subscriber or consumer of the input/output events passed to the browser. The agent periodically wakes up and waits to detect subscribed events such as a mouse movement notification event passed to it. If any subscribed events were passed to the agent while the agent is awake, the agent collects the event data such as the current mouse coordinates or the last key stroke. If there are no detected human interaction events, the agent checks if a detection timer has timed out in step 304.

If the detection timer has not timed out in step 304, the agent keeps checking for human interaction events in step 302. When a human interaction event is detected on the client system in step 302, the agent collects data associated with the human interaction event in step 306. In some embodiments, coordinates of mouse pointers on a display screen may be collected. In other embodiments, letters or symbols entered on a keyboard, a touch screen, a pen input device, or a speech recognition device may be recorded. The collected data is sent to the server in step 308. In some embodiments, the collected data is encoded as a file name and embedded in an HTTP request sent to the server. The HTTP request may result in an error message logged in a server log on the server because the HTTP request essentially asks for a file that does not exist. In such an implementation, the HTTP server of the server may log the "404—File Not Found" error in association with the request, and possibly, an IP address and/or browser cookie appended to the request. As one skilled in the art will appreciate, in the above-described embodiment, if the agent does not detect human activity, the logs of the server will not contain such error data.

In some other embodiments, the collected data transmitted to the server may be validated and analyzed by the server. The validation and analysis may occur in real time, i.e., may occur as soon as the data is received by the server, or offline, i.e., may occur when analyzing the server log. The server therefore may ultimately determine whether the events are indeed generated by a human interacting with the client system. In other embodiments, however, determination may be made on the client system whether a human is interacting with the client system either before or after sending the collected data to the server in step 308.

In some embodiments, the server may adjust a communication policy with the client system. For example, if the server determines that one or more bots are running on a client system, the server may ignore clicks on the advertisements from the client system or discontinue serving advertisements to the client system.

After the collected data is sent to the server, the agent enters into a sleep timer in step 310. The sleep timer puts the agent in sleep mode until it times out. When the sleep timer times out, the agent again checks for human interaction event in step 302. If the detection timer timed out in step 304, the agent enters into a sleep timer in step 310 and waits for the sleep timer to time out so that it may check for human interaction event again in step 302.

Figure 4:
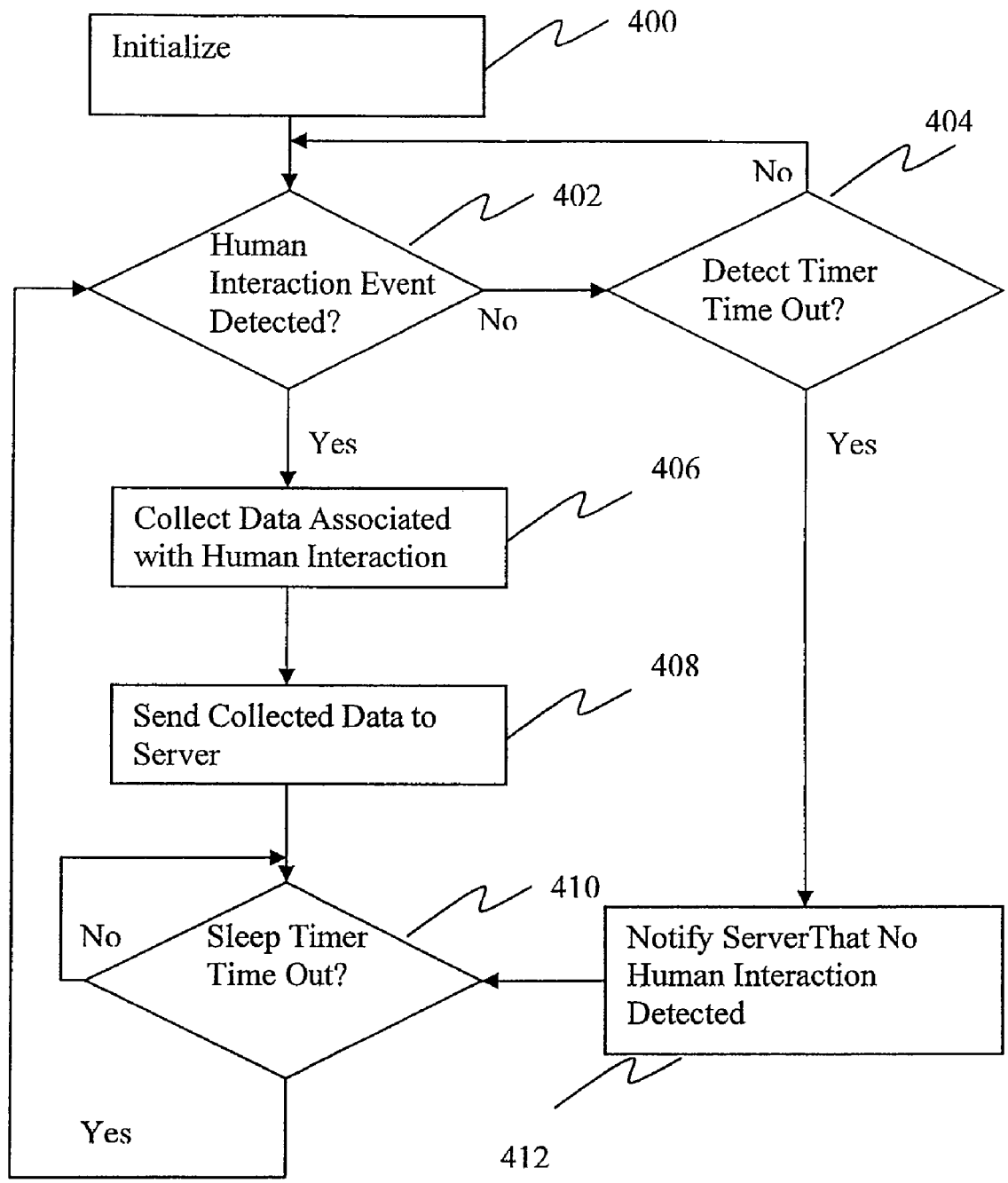
FIG. 4 is a diagram showing a flowchart of another example process used for detecting one or more human interaction events on a client system.

FIG. 4 illustrates another example process used for detecting one or more human interaction events on a client system, which process may be used by an embodiment of the present invention. The agent in this example is similar to the one shown in FIG. 3 except that the agent would periodically communicate with the server even if no human interaction events were detected. After initialization in step 400, the agent checks human interaction events in step 402. If any human interaction events are detected, the agent collects data associated with the detected human interaction event in step 406 and sends the collected data to the server in step 408. The agent then enters into a sleep timer in step 410. When the sleep timer times out in step 410, the embodiment again checks for human interaction events in step 402. If no human interaction events are detected, the embodiment enters into a detection timer in step 404. If the detection timer has not timed out, the embodiment keeps checking for human interaction events in step 402. If the detection timer times out, rather than immediately entering into a sleep timer as in FIG. 3, the agent instead notifies the server that no human interaction events are detected in step 412 before it enters into the sleep timer in step 410.

Figure 5:
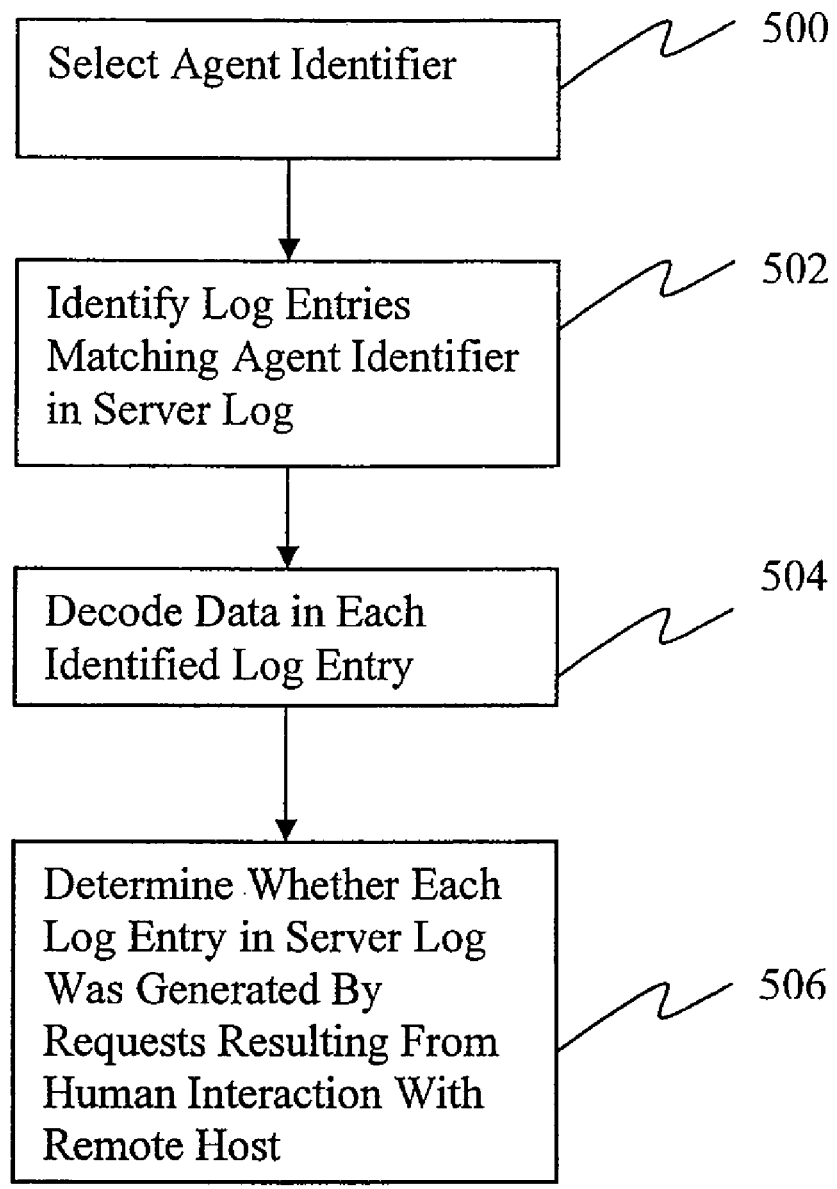
FIG. 5 is a diagram showing a flowchart of the example process used for identifying human interaction events in a server log.

FIG. 5 illustrates an example process to identify requests generated by bots in a server log, which process may be used by an embodiment of the present invention. In the process's first step 500, the agent selects an identifier for an agent wherein the identifier comprises one or more bytes. An agent is a program written in a programming or scripting language such as Java, JavaScript or ActionScript. An agent runs on a client system and communicates with the server. In the server log, log entries may be generated by requests from one or more agents on one or more client systems. In order to identify requests from various agents, predefined identifiers may be used for each agent. Each agent is associated with an identifier comprising one or more bytes. In one embodiment, the identifier for an agent may be a predefined name of a file that does not exist on the server. When the agent on a client system communicates with the server, it sends an HTTP request to the server to fetch the file with the predefined name. When the server receives the HTTP request, it creates a server log entry indicating an error occurred for the request since the file with the predefined name does not exist on the server. In the same server log entry, the predefined file name and other parameters in the HTTP request are also logged. In some embodiments, the parameters may be encrypted with XOR using a shared secret which may be decoded at analysis time. Other encryption protocols may be used in other embodiments.

In another embodiment, the identifier for an agent may be encoded in one of the parameters of an HTTP request. Typically, a server log entry for an HTTP request includes one or more bytes comprising encoded values of an IP address from which the request is sent, a request end time, a request duration, a number of bytes sent, an HTTP host, an HTTP method, a response status, one or more cookies, a user-agent, a referrer, one or more advertisement IDs, and one or more user-defined values. The identifier of an agent may be encoded in the user-defined values in the request and is logged in the server log.

After an identifier of an agent is selected in step 500, the embodiment in step 502 identifies the log entries in the server log which contain the selected agent identifier. For each log entry that contains the selected agent identifier, the embodiment decodes the values encoded in the log entry in step 504. The decoded value may entail an IP address, a user-agent, an HTTP cookie, and data associated with human interaction events detected by the selected agent. Based on the decoded values, in step 506, the embodiment determines whether each log entry in the server log was generated by requests resulting from human interaction on the client system.

In one embodiment, one or more user sessions may be identified based on the identified IP addresses, the user-agents, or the HTTP cookies. HTTP cookies are used by Web servers to differentiate users and to maintain user session data related to the same user during multiple HTTP requests. If one or more user sessions can be identified from the server log, the embodiment may identify a first group of user sessions in which HTTP requests were received from the agent with the selected identifier, and a second group of user sessions in which no such requests were received. Since the agent on the client system typically sends an HTTP request when human interaction events are detected on the client system, lack of HTTP requests in a user session typically indicates that the HTTP requests in the user session are generated by one or more bots. Therefore, the embodiment may determine that each log entry from any of the second group of user sessions in which no HTTP requests were received from the selected agent is generated by one or more bots. On the other hand, the embodiment may determine that each log entry from any of the first group of user sessions in which HTTP requests were received from the selected agent is generated by a request created as a result of interaction between a human viewer and the client system.

In another embodiment, a web page may be identified in the server log based on the HTTP cookies. The embodiment may identify whether there are any human interaction events logged in the server log that are sufficiently close in time when the web page was accessed. As a result, the embodiment may infer whether actions taken relative to the web page were generated by bots based on the existence of human interaction event in close proximity of the time when the web page was accessed.

In another embodiment, the selected agent may periodically send HTTP requests to the server even if no human interaction events are detected on the client system. The embodiment, therefore, may not conclude that log entries in the server log in which HTTP requests were received from the selected agent are generated by a human viewer. The embodiment, however, may decode data encoded in the HTTP requests from the selected agent. The data may indicate that the request was sent because no human interaction events were detected on the client system. The embodiment may therefore be able to identify user sessions in which the selected agents sent HTTP requests indicating that no human interaction events were detected. For each log entry in these identified user sessions, the embodiment may determine that each one of them was generated by requests from one or more bots. In some embodiments, real time validation of a user session can be achieved by identifying human interaction events logged in the server log in real time.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. For example, Asynchronous Javascript and XML (Ajax) can be used to transmit detected human interaction data to the remote server. Other embodiments will be evident to those of ordinary skill in the art. It is therefore not intended that the present invention be limited, except as indicated by the appended claims.

What is claimed is:

1. A method, implemented on at least one machine, each of which having at least one processor, non-transitory computer-readable storage medium, and a communication platform, said method comprising:

maintaining an interactive session with a remote host, wherein the remote host comprises an input/output device;

transmitting an agent to the remote host, wherein the agent is operative to (a) register as a subscriber on the remote host for events generated by manipulation of the input/output device of the remote host, (b) determine if interaction event data has been detected during a detection time interval in accordance with a detection timer, (c) collect the interaction event data that has been detected during the detection time interval, (d) transmit the transmit interaction event data corresponding to the events triggered by the manipulation of the input/output device to a data store, and (e) enter a sleep mode in accordance with a sleep timer after the interaction event data is transmitted, wherein the interaction event data comprises one or more positional coordinates of the input/output device of the remote host associated with corresponding events generated by the manipulation of the input/output device of the remote host; and determining whether a human has interacted with the remote host during the interactive session with the remote host by correlating the interaction event data transmitted by the agent with the interactive session with the remote host.

2. The method of claim 1, wherein the agent comprises a computer program operative within an execution environment of the remote host.

3. The method of claim 1, wherein the input/output device is a mouse device, and wherein the interaction event data comprises a location of one or more pixels on a display device pointed to by the mouse device.

4. The method of claim 1, wherein the interaction event data further comprises one or more symbols corresponding to one or more pressed keys on a keyboard connected to the remote host.

5. The method of claim 1, further comprising adjusting a communication policy with the remote host based on a result of the determining step.

6. One or more non-transitory computer-readable storage media encoded with computer-readable instructions operative, when executed, to cause one or more processors to:
  maintain an interactive session with a remote host wherein the remote host comprises an input/output device;
  transmit an agent to the remote host, wherein the agent is operative to (a) register as a subscriber on the remote host for events generated by manipulation of the input/output device of the remote host, (b) determine if interaction event data has been detected during a detection time interval in accordance with a detection timer, (c) collect the interaction event data that has been detected during the detection time interval, (d) transmit the interaction event data corresponding to the events triggered by the manipulation of the input/output device to a data store, and (e) enter a sleep mode in accordance with a sleep timer after the interaction event data is transmitted, wherein the interaction event data comprises one or more positional coordinates of the input/output device of the remote host associated with corresponding events generated by the manipulation of the input/output device of the remote host; and
  determine whether a human has interacted with the remote host during the interactive session with the remote host by correlating the interaction event data transmitted by the agent with the interactive session with the remote host.

7. The computer-readable storage media of claim 6, wherein the input/output device is a mouse device, and wherein the interaction event data comprises a location of one or more pixels on a display device pointed to by the mouse device.

8. The computer-readable storage media of claim 6, wherein the interaction event data further comprises one or more symbols corresponding to one or more pressed keys on a keyboard connected to the remote host.

9. An apparatus, comprising:
  a network interface;
  a memory;
  a processor;
  computer program code, physically stored on a non-transitory computer readable storage medium, comprising instructions operative to cause the processor and the apparatus to:
  maintain an interactive session with a remote host, wherein the remote host comprises an input/output device;
  transmit an agent to the remote host, wherein the agent is operative to (a) register as a subscriber on the remote host for events generated by manipulation of the input/output device of the remote host, (b) determine if interaction event data has been detected during a detection time interval in accordance with a detection timer, (c) collect the interaction event data that has been detected during the detection time interval, (d) transmit the interaction event data corresponding to the events triggered by the manipulation of the input/output device to a data store and (e) enter a sleep mode in accordance with a sleep timer after the interaction event data is transmitted, wherein the interaction event data comprises one or more positional coordinates of the input/output device of the remote host associated with corresponding events generated by the manipulation of the input/output device of the remote host; and
  determine whether a human has interacted with the remote host during the interactive session with the remote host by correlating the interaction event data transmitted by the agent with the interactive session with the remote host.

10. The method of claim 1 wherein the agent is embodied in a script embedded in a web page transmitted to the host.

11. The computer-readable storage media of claim 6 wherein the agent is embodied in a script embedded in a web page transmitted to the remote host.

12. The apparatus of claim 9 wherein the agent is embodied in a script embedded in a web page transmitted to the remote host.

13. The apparatus of claim 9 wherein the input/output device is a mouse device, and wherein the interaction event data comprises a location of one or more pixels on a display device pointed to by the mouse device.

14. The apparatus of claim 9 wherein the interaction event data further comprises one or more symbols corresponding to one or more pressed keys on a keyboard connected to the remote host.

* * * * *